US006995867B2

(12) United States Patent
Nye

(10) Patent No.: US 6,995,867 B2
(45) Date of Patent: Feb. 7, 2006

(54) COLOR ADJUSTED PRINTING

(75) Inventor: Andrew Nye, Skaneateles, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 938 days.

(21) Appl. No.: 09/861,417

(22) Filed: May 21, 2001

(65) Prior Publication Data

US 2002/0171851 A1 Nov. 21, 2002

(51) Int. Cl.
G06K 15/00 (2006.01)
H04N 1/46 (2006.01)
(52) U.S. Cl. .................. 358/1.9; 382/166; 358/539
(58) Field of Classification Search .............. 358/518, 358/298, 1.9, 3.1, 3.13, 3.23, 1.15, 1.16, 358/1.18, 5.3, 539; 382/1.66, 167
See application file for complete search history.

(56) References Cited

U.S. PATENT DOCUMENTS 5,083,860 A * 1/1992 Miyatake et al. ........... 352/129
5,469,536 A * 11/1995 Blank ........................ 345/594
5,483,625 A    1/1996 Robertson et al. ......... 358/1.18
5,519,815 A    5/1996 Klassen ..................... 358/1.9
5,563,985 A   10/1996 Klassen ..................... 358/1.9
5,748,484 A *  5/1998 Cannon et al. ............. 700/233
6,206,504 B1   3/2001 Payne ........................ 358/1.9
6,263,119 B1 * 7/2001 Martucci .................... 382/298
2002/0077892 A1 * 6/2002 Goring ........................ 705/14
2002/0080168 A1 * 6/2002 Hilliard et al. ............. 345/744
2003/0095596 A1 * 5/2003 Shimizu ................ 375/240.08

* cited by examiner

Primary Examiner—Jerome Grant, II
(74) Attorney, Agent, or Firm—George R. McGuire; Bond, Schoeneck & King, PLLC

(57) ABSTRACT

A program method of converting a multiple color file to a two-color, or limited color file, so that an image contained therein can be printed upon a receipt, Point Of Sale, or two-color printer. Most multiple color files that contain logos and graphics cannot be successfully reduced in color by automatic or computer generated methods. The programmatic method of this invention contains a second-stage routine that requests viewer participation and input. The resulting printed or displayed image is visually acceptable by reason of this viewer input.

20 Claims, 5 Drawing Sheets

COLOR ADJUSTED PRINTING

FIELD OF THE INVENTION

The present invention relates to a method and apparatus for printing in color and, more particularly, to a method of adjusting color files to print acceptable color graphics upon printing apparatuses having limited color capability.

BACKGROUND OF THE INVENTION

Many receipt-type printers have limited color printing capability, such as printing receipts in two colors. Those individuals who desire to print multiple color bitmap graphics on this type of color-limited printer will obtain an output that is generally unacceptable in terms of quality and visual appeal. The present invention seeks to provide a method of adjusting color bitmap files, to provide visually acceptable output for the average user when the images are rendered on a printer with limited color printing capability.

The current invention includes a method of reducing the number of colors in a color bitmap file. The method reflects the discovery that when a logo or graphic is automatically or computer-reduced in color quantity, the result is often unsatisfactory to the average viewer. The method of the invention comprises a combination of programmatic and manual color reducing routines that reduces the bitmap to a smaller number of colors. The color reducing routines are arranged in two stages. A first stage of the color reducing routines automatically reduces the bitmap file to fewer than a specified number of colors. A second stage of the color reducing routines then allows the individual user to manually map the reduced color bitmap to colors supported by the printer. It has been discovered that manually reducing the file to the limited number of colors of a two-color printer will often provide an image with acceptable visual result for the viewer.

U.S. Pat. No. 6,206,504 for METHOD AND APPARATUS FOR TWO-COLOR INK JET POINT OF SALE (POS) PRINTING issued to Stephen R. Payne describes a two-color ink jet point of sale printer that includes a converter for converting full color printing commands into commands for printing in two colors: a primary color and an alternate color.

SUMMARY OF THE INVENTION

In accordance with the present invention, a method is provided for printing multi-color graphics in a limited number of colors. Despite the new limited color capability, the invention results in a visually acceptable product. The advantage of using the method of this invention is that it allows users to print graphics on printers with limited (two-color) capability. The method comprises a split program routine, wherein a first stage automatically reduces the number of colors contained in a bitmap. The second stage allows the user to further manually map the color file to fit the color printing limitations of the printer. The first stage of the program routine contains a color-reducing algorithm, in which parameters are set to control the color reduction process and define the resultant number of colors. The algorithm automatically converts the file to a smaller number of colors, and then the program presents the user with a split screen containing color swatches of the bitmap.

On one side, the first template of colors contains all of the colors remaining in the reduced-color bitmap. Adjacent thereto, the second template of colors contains the colors according to the printing capability of the printer being used. In the case of a receipt or Point Of Sale (POS) printer, such printing would contain only two sets of colors: for example, black and red or black and blue, plus white, the color of the paper. Selected dithered combinations of these colors can also be printed. The user then maps each color area in the first template to one in the second template, in order to reduce the colors to the limited color capacity of the printer. Different colors in the first color template may map to the same printing color in the second template.

Upon mapping all of the colors, the program converts all of the colors in the image to the chosen colors: the final image is illustrated on the screen. The user can then save the image in a variety of formats and/or print the image.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the programming screen method of this invention will bear the same designations or numbering throughout the figures.

DESCRIPTION OF THE PREFERRED EMBODIMENT

Generally speaking, the invention features a program method of converting a multiple color file to a two-color or limited-color file, so that an image contained therein can be printed upon a receipt, Point Of Sale, or two-color printer. Many multiple color graphic files cannot be acceptably reduced in color by automatic methods. The program method of this invention contains a second-stage routine that requests user participation and input. The resulting printed image is visually acceptable by reason of this user input.

Figure 1:
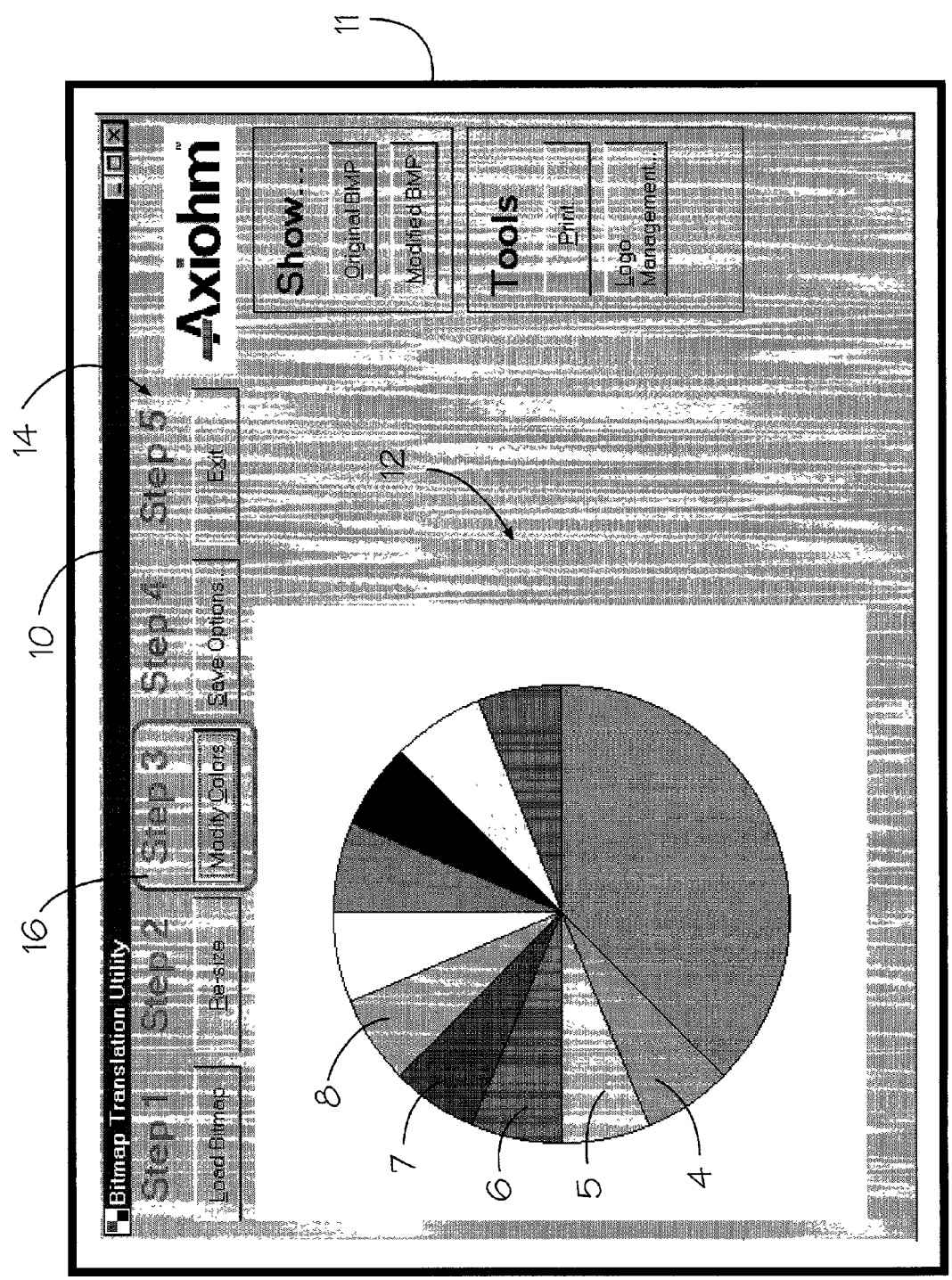
FIG. 1 illustrates a front view of a screen of a computer containing an original graphic presented in bitmap format, in accordance with the method of this invention.

Now referring to FIG. 1, a monitor screen 11 illustrates an image (e.g., a logo) 12 and program format 14, in the main window 10, invoked by the bitmap translation utility program of the method of this invention. Initiation of the bitmap translation utility program causes the screen 11 to display the program format 14, containing a number of process steps (Steps 1 through 5), shown at the top of window 10. Using the computer mouse, not shown, the user is encouraged to click upon Step 1, which loads a bitmap file into the program. The bitmap file contains a color graphic, as illustrated by the pie-shape 12, shown by way of example. The displayed graphic 12 comprises a number of color regions 4, 5, 6, 7, 8, etc.

The image 12 may have to be resized to fit a particular printer. This can be accomplished by clicking upon Step 2. After resizing, the user clicks the mouse on Step 3, box 16, which modifies the color data in the file, so that the image 12 can be printed upon a printer having limited color printing capabilities (i.e., can print in only a small number of colors). Such limited color printing machines are typically those that print receipts, are used at Point Of Sale, and which generally print in two colors. Of course it should be understood that any of a limited number of colors can be used.

Figure 2:
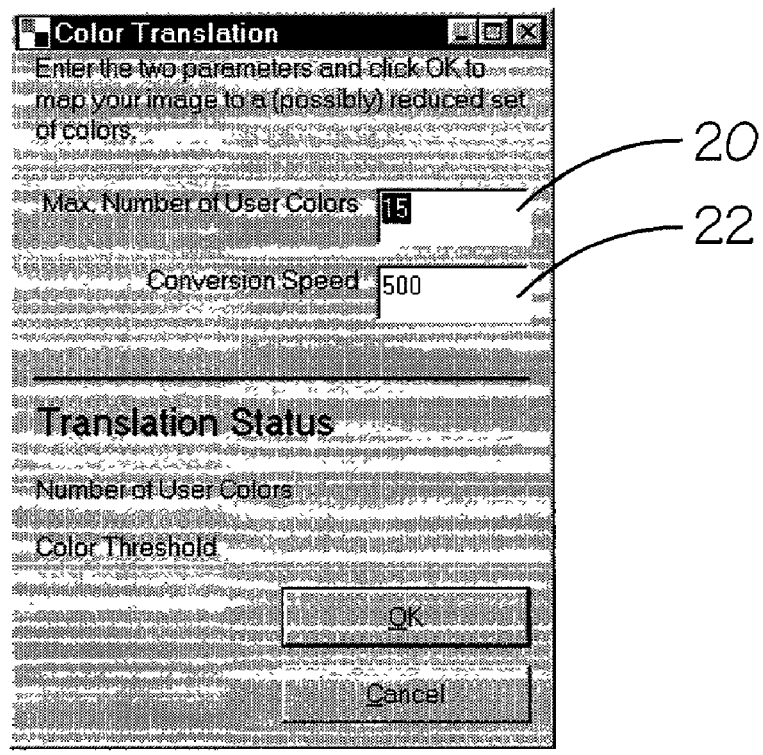
FIG. 2 depicts a front view of the screen, wherein the program of the method displays a color translation form for entering information in the color conversion process.

Upon clicking Step 3 box 16, the form 18, shown in FIG. 2, appears upon the monitor 11. Form 18 requires that the user insert the number of colors, exclusive of black and white, into box 20, corresponding to the number of colors the image 12 should be reduced to programmatically. The form 18 also requires the user to select the conversion speed, in box 22. It is to be noted here that this part of the process does not map any colors to white. Nor are the colors "white" or "black", shown in the image 12, mapped to any other colors.

The aforementioned programmatic color reduction process is performed by a three-step algorithm, as follows:
- a) count the pixels of each color in the original image or bitmap;
- b) convert the pixels in the image or bitmap of the least common color to one of the other colors (i.e., the color that is closest in RGB color space); and
- c) repeat step (b) until the number of resultant colors is no greater than the number of colors specified by the user in box 20 (FIG. 2).

Figure 3:
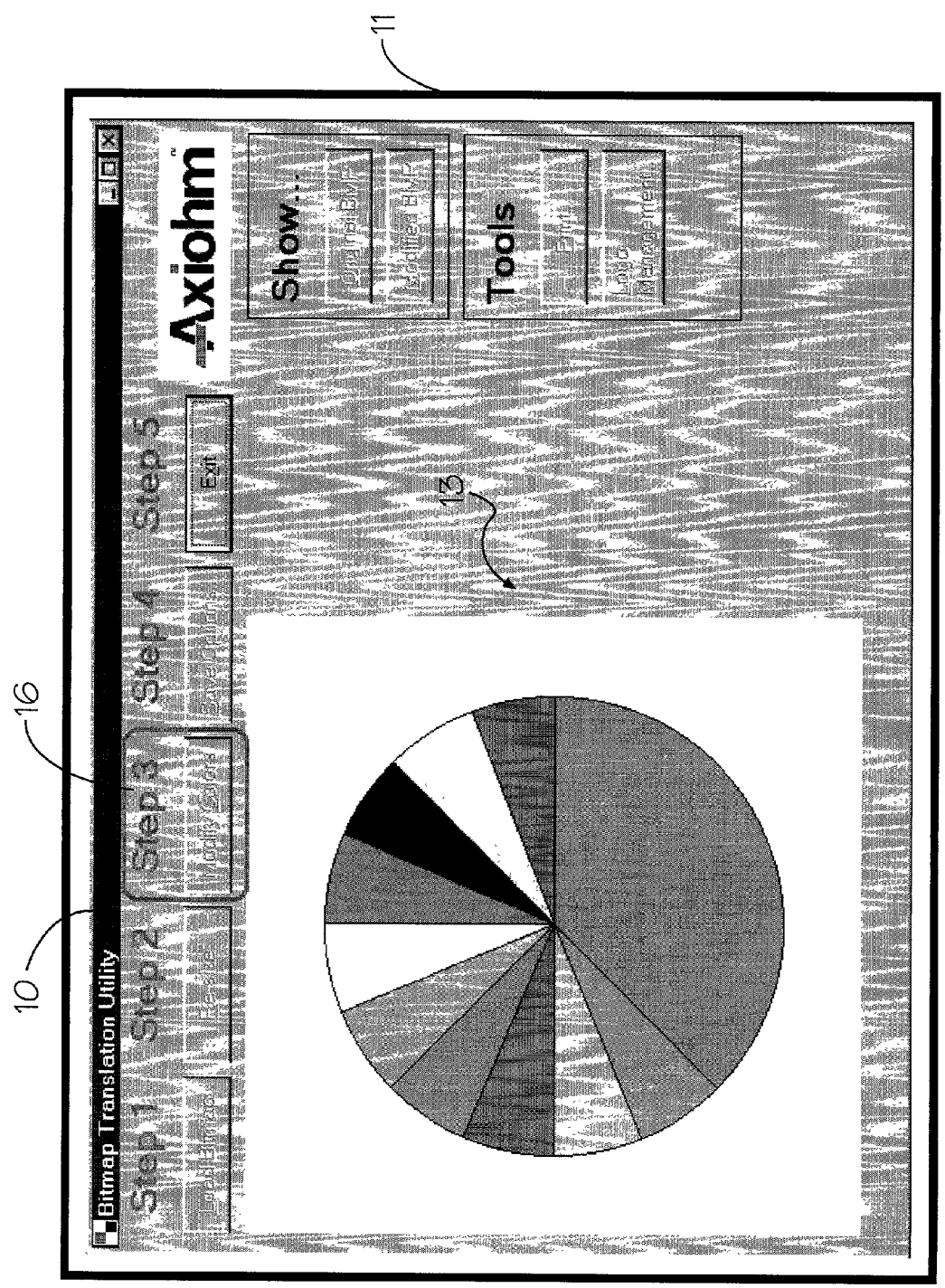
FIG. 3 shows a front view of the screen after the program of the method of this invention has automatically reduced the colors of the graphic depicted in FIG. 1.

At this point, the first stage of the program method of this invention is complete. The color image 12 is now automatically reduced to the specified number of colors. The monitor 11 displays the image 13 in the reduced colors, as shown in FIG. 3.

Figure 4:
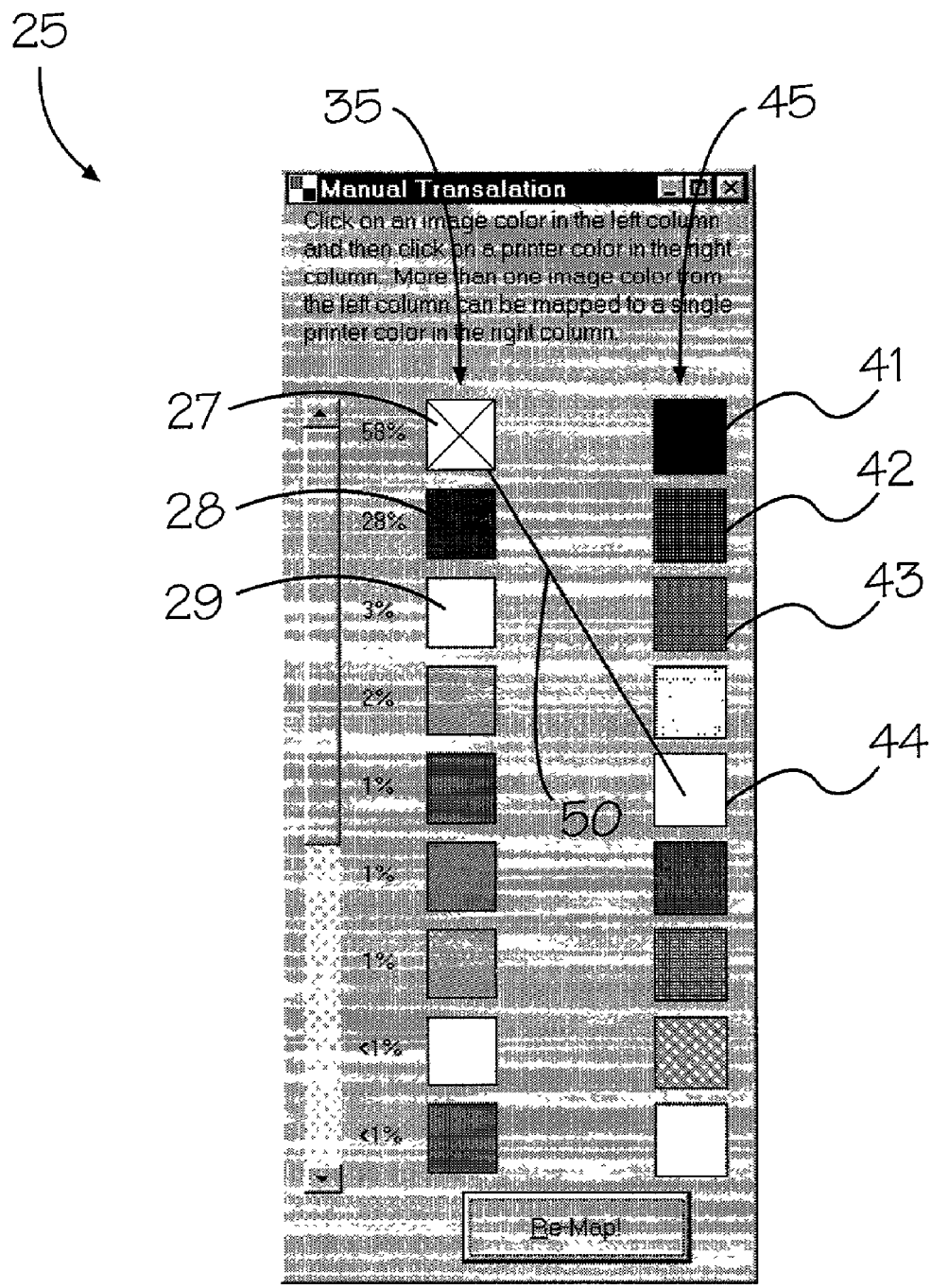
FIG. 4 illustrates a front view of the screen having a manual color selecting template.

The method of this invention also provides for user (manual) input, with two-color adjustment being provided by a second stage in the program routine. The second stage is described hereinafter, with reference to FIG. 4. A split template 25 for manual color adjustment is shown. The template 25 contains color swatches 27, 28, 29, etc. of the image 13, on left side 35. The left side swatches 27, 28, 29, etc. contain all of the colors remaining in the reduced-color image 13. Adjacent thereto, the right side 45 of template 25 contains color swatches 41, 42, 43, 44 etc. These colors represent color shades and textures in accordance with the printing capability of the printer being used. In the case of a receipt or Point Of Sale printer, such printing would contain only two color sets: for example black and red, black and blue, and shades thereof. Since white is typically the color of the paper, by dithering the other aforementioned colors, shades of such colors can also be obtained. The user then maps each color area in the left side 35 of the template 25, in order to reduce the colors down to the limited color capacity of the printer.

Different colors in the left side 35 of the multiple color template 25 may map to the same printing color (swatch) on the right side 45.

The procedure for mapping the colors is as follows: (i) the user clicks for example on swatch 27 on left side 35 of template 25; (ii) thereafter, the user clicks on a color swatch, for example 44 on the right side 45 of the template 25; (iii) the program now draws a line 50 between swatch 27 and swatch 44, and places an "X" in the swatch 27 to indicate that this color has been mapped; and (iv) the user then proceeds to map all of the remaining swatches 28, 29, etc. on the left side 35 of the template 25.

Figure 5:
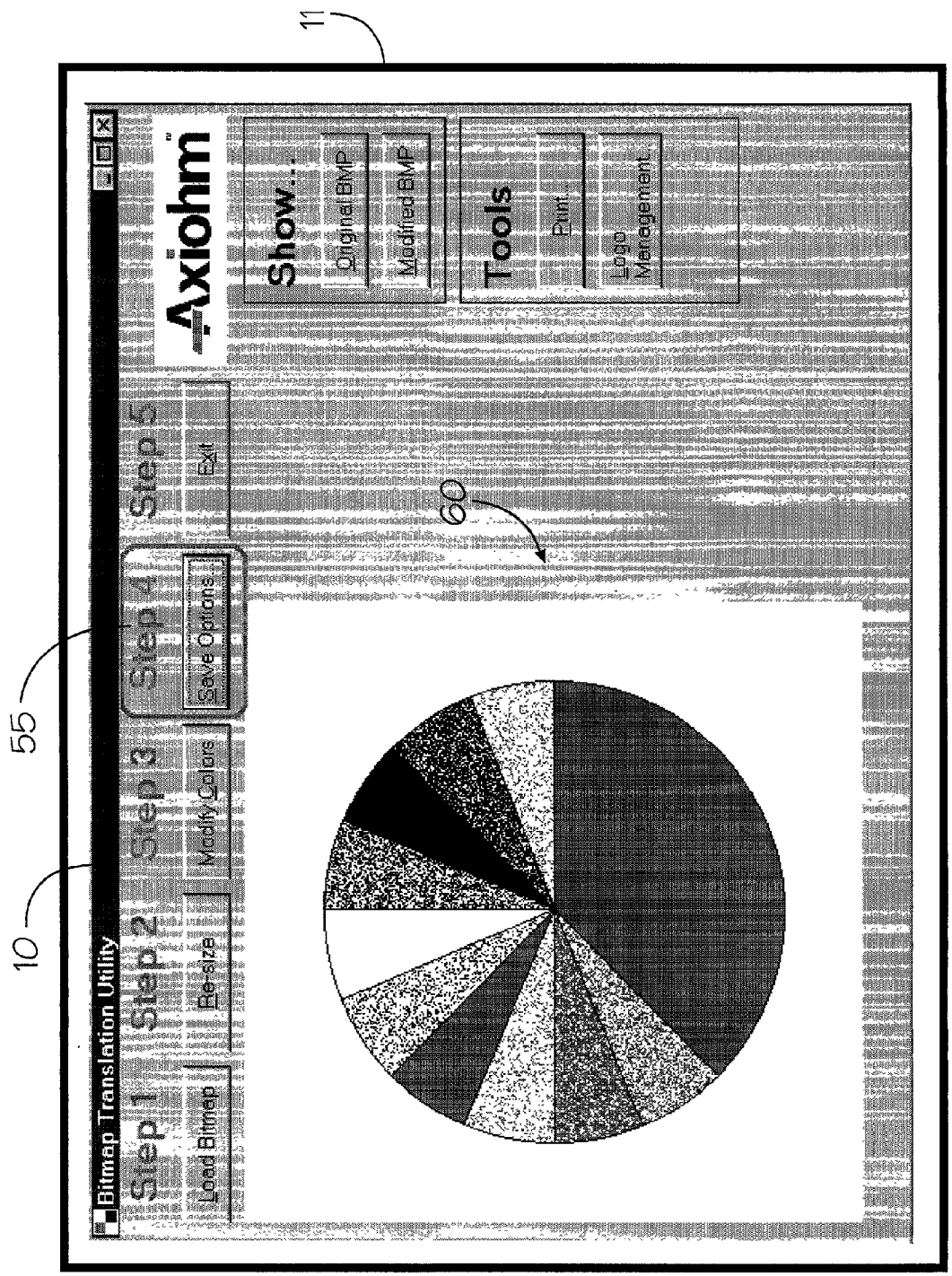
FIG. 5 depicts a front view of the screen showing a final image of the processed graphic.

Upon mapping all of the colors, the program converts all of the colors in the image 12 to the chosen colors. The final image 60 is illustrated on the screen 11, as shown in FIG. 5.

The user can then save the image 60 by clicking on box 55 (Step 4). The image 60 can be saved to a variety of formats, and can also be printed.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

1. A method of converting a multi-colored image, logo, or graphic contained in a file to an alternate color image, logo, or graphic having fewer colors, so that it will be printable upon a limited-color printer, said method comprising the steps of:
   a) loading a file containing an image, logo, or graphic into a program;
   b) programmatically reducing the colors of said image, logo, or graphic to a predetermined number of colors and then;
   c) manually changing color regions of said image, logo, or graphic.

2. The method in accordance with claim 1, further comprising the step of:
   d) resizing said image, logo, or graphic to fit said limited-color printer.

3. The method in accordance with claim 2, further comprising the step of:
   e) printing said image, logo, or graphic upon a limited-color, two-color, receipt, or Point Of Sale printer.

4. The method in accordance with claim 1, further comprising the step of:
   d) printing said image, logo, or graphic upon a limited-color, two-color, receipt, or Point Of Sale printer.

5. The method in accordance with claim 1, further comprising the step of:
   d) saving said image, logo, or graphic in a computer file.

6. The method in accordance with claim 5, further comprising the step of:
   e) saving said image, logo, or graphic in a different format from said file.

7. The method in accordance with claim 2, further comprising the step of:
   e) saving said image, logo, or graphic in a computer file after the steps of reducing and changing the colors of said image, logo, or graphic and resizing said image, logo, or graphic.

8. The method in accordance with claim 7, further comprising the step of:
   f) saving said image, logo, or graphic in a different format from said file after the steps of reducing and changing the colors of said image, logo, or graphic and resizing said image, logo, or graphic.

9. The method in accordance with claim 1, further comprising the step of:
   d) selecting the number of colors for said image, logo, or graphic corresponding to a limited color printer.

10. The method in accordance with claim 9, further comprising the step of:
    d) selecting a conversion speed for said image, logo, or graphic corresponding to said limited-color printer.

11. A method of converting a multi-colored bitmap contained in a file to an alternate color bitmap representation having fewer colors, so that it will be printable upon a limited-color printer, said method comprising the steps of:
   a) loading a file containing a bitmap into a program;
   b) programmatically reducing the colors of said bitmap to a predetermined number of colors; and then
   c) manually changing color regions of said bitmap.

12. The method in accordance with claim 11, further comprising the step of:
   d) printing said bitmap upon a limited-color, two color, receipt, or Point Of Sale printer.

13. The method in accordance with claim 11, further comprising the step of:
   d) saving said bitmap in a computer file.

14. The method in accordance with claim 13, further comprising the step of:
   e) saving said bitmap in a different format from said file.

15. The method in accordance with claim 11, further comprising the step of:
   e) selecting the number of colors for said bitmap corresponding to a limited-color printer.

16. The method in accordance with claim 15, further comprising the step of:
   d) selecting a conversion speed for said bitmap corresponding to said limited-color printer.

17. The method in accordance with claim 11, further comprising the step of:
   d) resizing said bitmap to fit said limited-color printer.

18. The method in accordance with claim 17, further comprising the step of:
   e) printing said bitmap upon a limited-color, two-color, receipt, or Point Of Sale printer.

19. The method in accordance with claim 17, further comprising the step of:
   e) saving said bitmap in a computer file.

20. The method in accordance with claim 19, further comprising the step of:
   f) saving said bitmap in a different format from said file.

* * * * *